US011061728B2

(12) United States Patent
Dubeyko et al.

(10) Patent No.: US 11,061,728 B2
(45) Date of Patent: Jul. 13, 2021

(54) SYSTEMS AND METHODS FOR HETEROGENEOUS ADDRESS SPACE ALLOCATION

(71) Applicant: Western Digital Technologies, Inc., San Jose, CA (US)

(72) Inventors: Viacheslav Dubeyko, San Jose, CA (US); Luis Vitorio Cargnini, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 30 days.

(21) Appl. No.: 16/274,060

(22) Filed: Feb. 12, 2019

(65) Prior Publication Data

US 2020/0257562 A1 Aug. 13, 2020

(51) Int. Cl.
  *G06F 9/50* (2006.01)
  *G06F 12/02* (2006.01)
  *G06F 9/445* (2018.01)
  *G06F 9/455* (2018.01)
  *G06F 12/06* (2006.01)

(52) U.S. Cl.
  CPC .......... *G06F 9/5016* (2013.01); *G06F 9/445* (2013.01); *G06F 9/45512* (2013.01); *G06F 12/023* (2013.01); *G06F 12/0646* (2013.01)

(58) Field of Classification Search
  CPC .. G06F 12/023; G06F 12/0646; G06F 9/5016; G06F 9/445; G06F 9/45512
  See application file for complete search history.

(56) References Cited

U.S. PATENT DOCUMENTS

| | | | |
|---|---|---|---|
| 2006/0212871 A1* | 9/2006 | Cook | G06F 9/5083 718/104 |
| 2010/0250824 A1* | 9/2010 | Belay | G06F 9/45558 711/6 |
| 2015/0373093 A1* | 12/2015 | Ashok | G06F 9/45558 709/223 |
| 2016/0054922 A1* | 2/2016 | Awasthi | G06F 3/0685 711/103 |
| 2018/0107467 A1* | 4/2018 | Yang | G06F 8/61 |
| 2018/0336067 A1* | 11/2018 | Lee | H04L 47/193 |
| 2018/0349209 A1* | 12/2018 | Steffen | G06F 9/4881 |
| 2019/0042138 A1* | 2/2019 | Guim Bernat | G06F 3/0614 |
| 2019/0065374 A1* | 2/2019 | Hower | G06F 12/023 |
| 2019/0347125 A1* | 11/2019 | Sankaran | G06F 9/4881 |

* cited by examiner

*Primary Examiner* — Jane Wei
(74) *Attorney, Agent, or Firm* — Vierra Magen Marcus LLP

(57) ABSTRACT

A system and method for allocating memory to a heterogeneous address space includes identifying, by an operating system, at least one superset feature from an application configured to be executed on a host device. The address space associated with the application includes a plurality of supersets, and wherein the operating system allocates the memory to each of the plurality of supersets from a non-volatile memory or a volatile memory based upon the at least one superset feature.

16 Claims, 9 Drawing Sheets

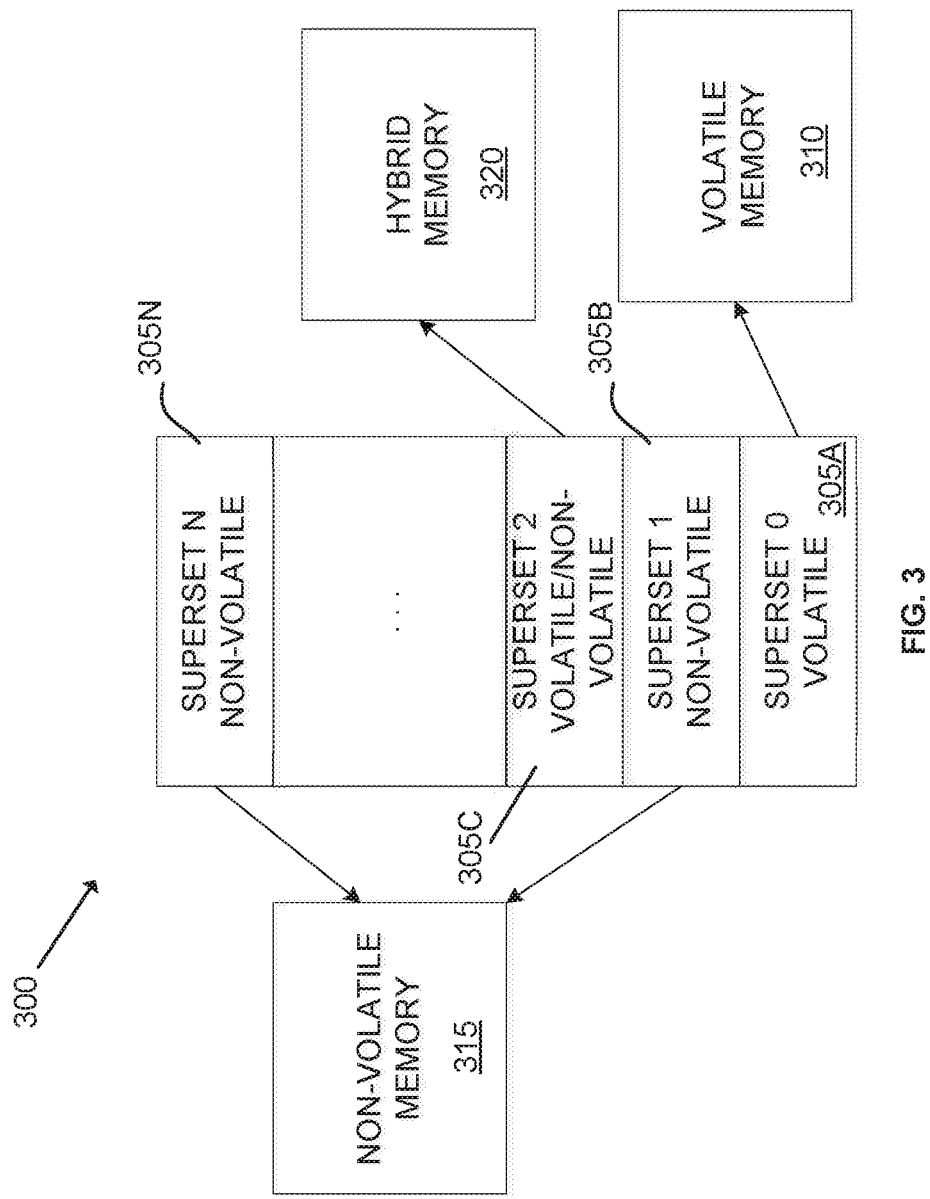

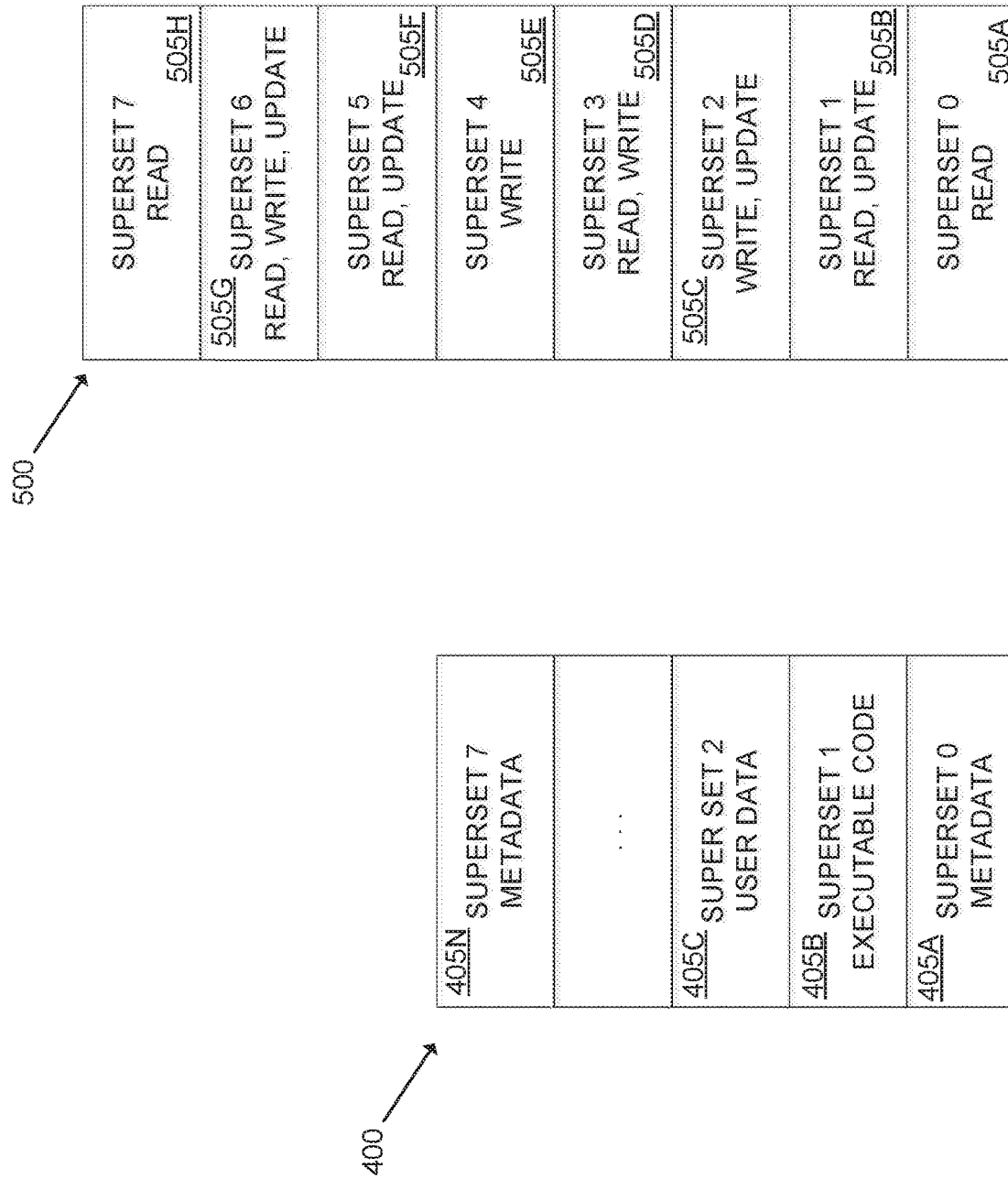

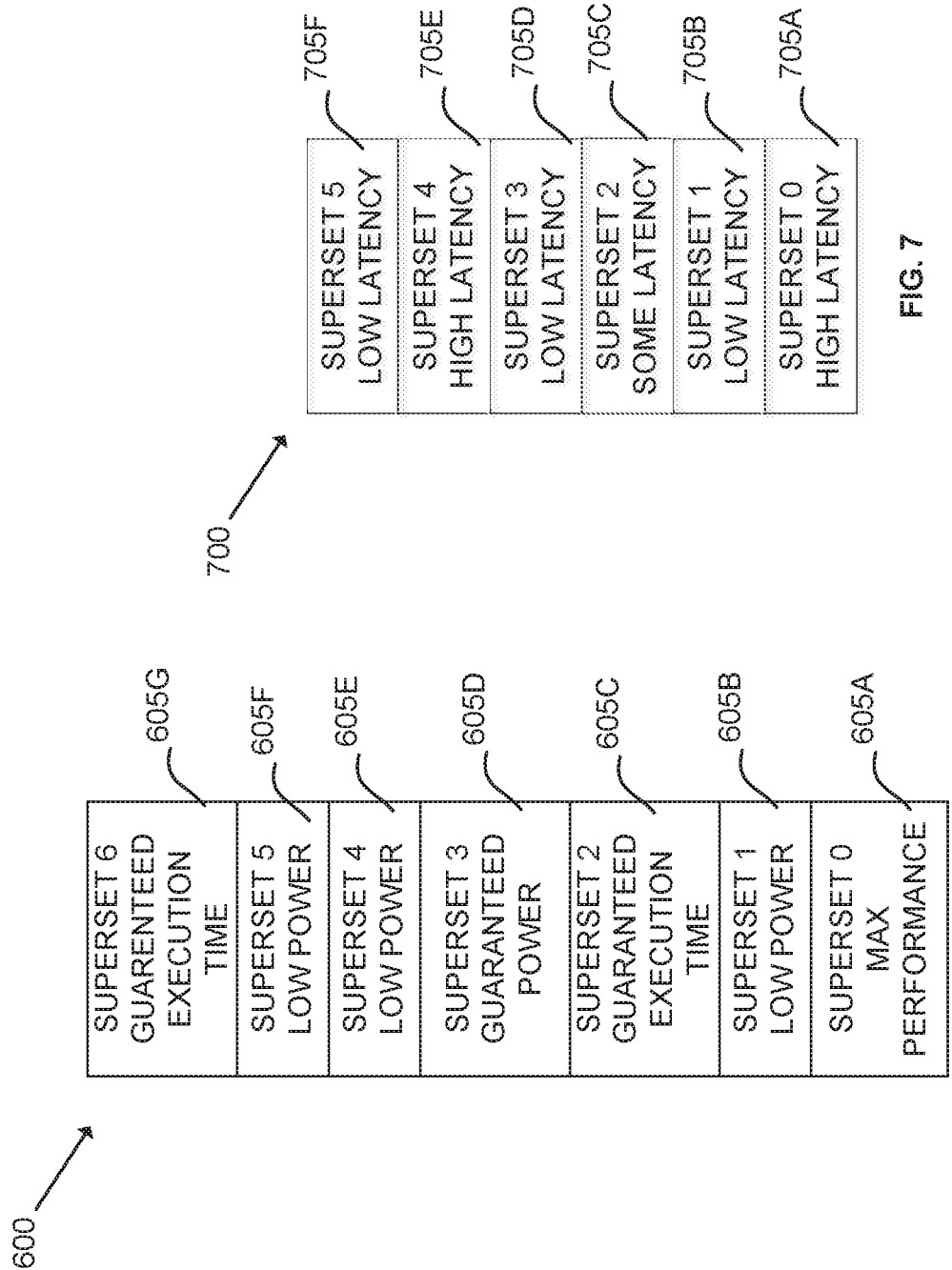

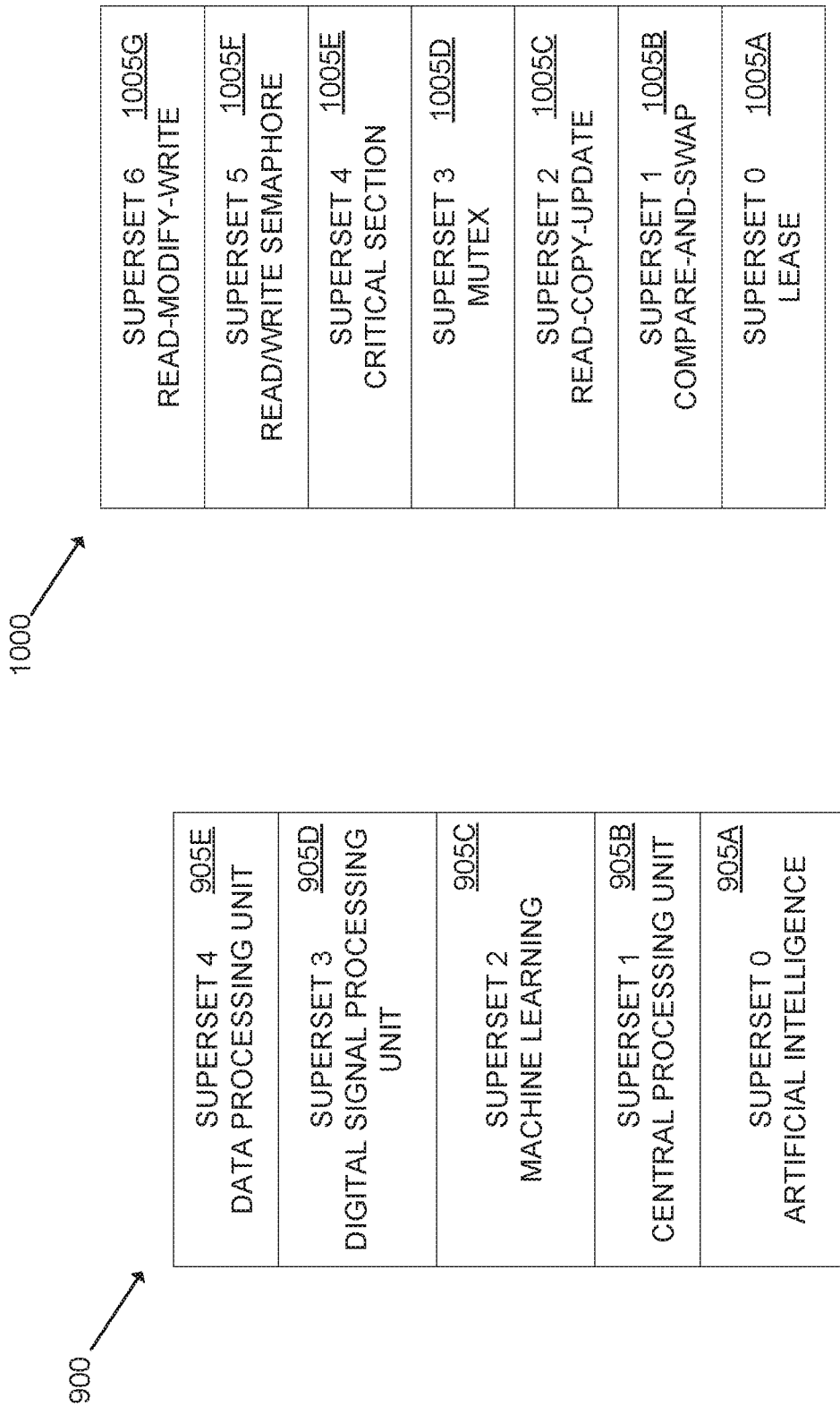

SYSTEMS AND METHODS FOR HETEROGENEOUS ADDRESS SPACE ALLOCATION

BACKGROUND

The following description is provided to assist the understanding of the reader. None of the information provided or references cited is admitted to be prior art.

Modern computing systems have a variety of applications installed thereon. The operating system of a computing system creates a special shell during a boot process of the computing system for interaction with a user. When a user desires to start an application installed on the computing system, the user provides an input via the special shell. Upon receiving the input, the operating system starts the application and creates an execution ready process for the application. The operating system creates the execution ready process by copying the application's executable code from a non-volatile memory to a volatile memory of the computing system. The executable ready process of the application then requests the operating system for memory allocation to run the application. Upon receiving the memory allocation request, the operating system allocates memory to the application in the application's address space. However, present day computing systems have limitations due to the configuration of the address space and how the operating system allocates memory to the address space.

SUMMARY

In accordance with some aspects of the present disclosure, a method is disclosed. The method includes identifying, by an operating system, at least one superset feature from an application configured to be executed on a host device and allocating, by the operating system, memory to an address space associated with the application. The address space includes a plurality of supersets. The operating system allocates the memory to each of the plurality of supersets from a non-volatile memory or a volatile memory based upon the at least one superset feature.

In accordance with some other aspects of the present disclosure, a system is disclosed. The system includes a host device having a processing unit configured to execute an application and an operating system configured to allocate memory to an address space associated with the application. The operating system is configured to identify at least one superset feature from the application and allocate the memory to the address space from non-volatile memory and volatile memory based upon the at least one superset feature.

In accordance with yet other aspects of the present disclosure, a non-transitory computer-readable media including computer-executable instructions embodied thereon is disclosed. The instructions, when executed by a processing unit of a computing system, cause an operating system of the computing system to perform a process including receiving a request for memory allocation from an application of the computing system, identifying at least one superset feature from the application, selecting between volatile memory and non-volatile memory based upon the at least one superset feature, determining that the selected one of the volatile memory or the non-volatile memory comprises a plurality of memory types, and selecting one of the plurality of memory types from the selected one of the volatile memory or the non-volatile memory for allocating memory to each location of an address space associated with the application.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIG. 3 is another example block diagram of the virtual address space of FIG. 2 showing memory allocation from volatile memory, non-volatile memory, or hybrid memory, in accordance with some embodiments of the present disclosure.

FIG. 4 is another example block diagram of the virtual address space of FIG. 2 showing memory allocation based upon a data type, in accordance with some embodiments of the present disclosure.

FIG. 5 is another example block diagram of the virtual address space of FIG. 2 showing memory allocation based upon a workload type, in accordance with some embodiments of the present disclosure.

FIG. 6 is another example block diagram of the virtual address space of FIG. 2 showing memory allocation based upon power consumption, in accordance with some embodiments of the present disclosure.

FIG. 7 is another example block diagram of the virtual address space of FIG. 2 showing memory allocation based upon memory latency, in accordance with some embodiments of the present disclosure.

FIG. 9 is another example block diagram of the virtual address space of FIG. 2 showing memory allocation based upon hardware acceleration engines, in accordance with some embodiments of the present disclosure.

FIG. 10 is another example block diagram of the virtual address space of FIG. 2 showing memory allocation based upon locking primitives, in accordance with some embodiments of the present disclosure.

Figure 1:
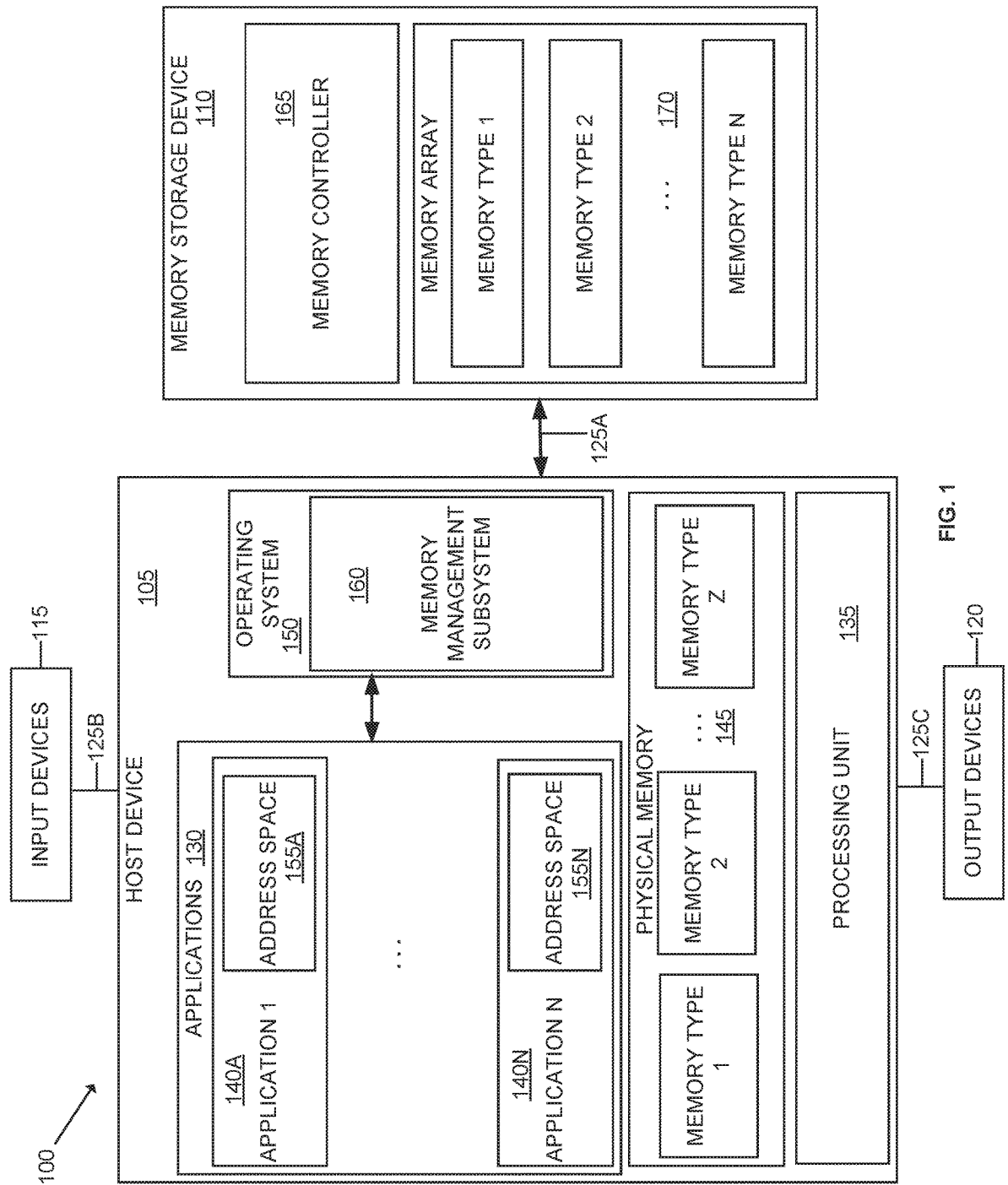
FIG. 1 is an example block diagram of a computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Modern computing systems have a variety of applications installed thereon. An operating system associated with the computing system creates a special shell during a boot process of the computing system. The special shell is a user interface that allows a user to access the services of the operating system. When the user desires to run an application, the user provides an input to the operating system via the special shell. Upon receiving the input, the operating system creates an execution ready process for that application. The execution ready process requests memory allocation from the operating system. Each application is associated with a virtual address space that defines a range of virtual addresses that store the data, code, and variables required for execution. A memory management subsystem of the operating system associates physical memory with the virtual addresses in the virtual address space of the application.

Modern operating systems imagine physical memory as a space of volatile, byte-addressable pages of fixed granularity (e.g., four kilobytes, eight kilobytes, etc.). Thus, the address space, which is allocated memory from a single type of volatile memory, may be considered a "homogenous" address space. While homogenous address spaces are suitable for some applications, such homogenous address spaces have limitations. Homogeneous address spaces do not take advantage of emerging next generation of non-volatile memories that may be as fast, if not faster, than volatile memories.

A host device may include several types of volatile and non-volatile memories having varying memory characteristics. A computing system having these different types of memories needs to be able to operate efficiently in such a heterogeneous environment, as well as take advantage of the relative memory characteristics of the various memory types to improve data processing. A homogenous address space does not take advantage of these various memory types and their relative memory characteristics. Thus, homogenous address spaces can only achieve limited improvements in data processing.

Accordingly, the present disclosure provides technical solutions for improving data processing by implementing a heterogeneous address space. The heterogeneous address space is composed of one or more supersets. Each of the one or more supersets may be allocated memory based upon one or more superset features. Specifically, upon receiving a request for memory allocation, the operating system identifies one or more superset features from the application requesting memory allocation. These superset features may be one or more of data type, workload type, power requirement, latency, locking primitive, hardware acceleration engine, etc. Based on these superset features, the operating system may determine whether volatile or non-volatile memory is more suitable for the data/code being stored in the superset. If the selected memory category (volatile or non-volatile) has multiple memory types, the operating system may also determine which of the various memory types may be most suitable for the data/code in the superset. Thus, each superset is an abstraction that is allocated memory from the physical memory based on one or more features that facilitates efficient execution of the associated application.

Further, the memory allocation of a particular superset may vary multiple times during the same execution of the application. For example, when the data stored in a particular superset is swapped out for another data, the operating system may consider the superset feature(s) that may apply to the new data and vary memory allocation based on the new data. In some embodiments, the operating system may also vary the size of each superset such that each superset is appropriately sized for the data/code that is stored in that superset. Thus, the size of each superset may vary multiple times during the same execution of the application.

Therefore, the heterogeneous address space of the present disclosure provides several advantages over homogenous address spaces. For example, the heterogeneous address space leverages the various types of memories and their relative differences in memory characteristics in improving data processing. Instead of simply allocating volatile memory, the heterogeneous address space identifies the memory category that may be most suitable for a particular data/code for allocation. The heterogeneous address space also determines the appropriate size of each superset based on the data/code that is stored in that superset. Thus, each superset is appropriately sized instead of being of a fixed size.

Referring to FIG. 1, an example block diagram of a computing system 100 is shown, in accordance with some embodiments of the present disclosure. The computing system 100 includes a host device 105 associated with a memory storage device 110. The host device 105 may be configured to receive input from one or more input devices 115, and provide output to one or more output devices 120. The host device 105 may be configured to communicate with the memory storage device 110, the input devices 115, and the output devices 120 via appropriate interfaces 125A, 125B, and 125C, respectively. The computing system 100 may be implemented in a variety of computing devices such as computers (e.g., desktop, laptop, etc.), tablets, personal digital assistants, mobile devices, wearable computing devices such as smart watches, other handheld or portable devices, or any other computing unit suitable for performing operations using the host device 105.

The input devices 115 may include any of a variety of input technologies such as a keyboard, stylus, touch screen, mouse, track ball, keypad, microphone, voice recognition, motion recognition, remote controllers, input ports, one or more buttons, dials, joysticks, and any other input peripheral that is associated with the host device 105 and that allows an external source, such as a user, to enter information (e.g., data) into the host device and send instructions to the host device. Similarly, the output devices 120 may include a variety of output technologies such as external memories, printers, speakers, displays, microphones, light emitting diodes, headphones, plotters, speech generating devices, video devices, global positioning systems, and any other output peripherals that are configured to receive information (e.g., data) from the host device 105. The "data" that is either input into the host device 105 and/or output from the host device may include any of a variety of textual data, graphical data, video data, sound data, position data, combinations thereof, or other types of analog and/or digital data that is suitable for processing using the computing system 100.

The host device 105 may also be configured to run the applications 130 using a processing unit 135. Each of the applications 130 is a software program or group of programs that is configured to perform one or more operations for accomplishing one or more goals. The applications 130 may be configured for use by end users. In that regard, the applications 130 may be considered end user applications. In some embodiments, the applications 130 may include a plurality of applications, such as applications 140A-140N. In other embodiments, the applications 130 may include a single application. The number and type (e.g., what the application is designed to accomplish) of the applications 130 may vary from one embodiment to another depending upon the environment in which the computing system 100 is used.

The processing unit 135 may be configured to execute instructions (also referred to herein as executable code or code) for running the applications 130. The processing unit 135 may be implemented in hardware, firmware, software, or any combination thereof. "Executing an instruction" means that the processing unit 135 performs the operation(s) called for by that instruction. The processing unit 135 may retrieve a set of instructions from a memory for execution. For example, in some embodiments, the processing unit 135 may, directly or indirectly, retrieve the instructions from the memory storage device 110 and copy the instructions in an executable form to a physical memory 145 of the host device 105. In some embodiments, the processing unit 135 may be configured to execute instructions without first copying those instructions to the physical memory 145. The processing unit 135 may be a special purpose computer, and include logic circuits (e.g., arithmetic logic unit), hardware circuits, etc. to carry out the instructions. The processing unit 135 may include a single stand-alone processing unit, or a plurality of processing units that use the same or different processing technology. The instructions may be written using one or more programming language, scripting language, assembly language, etc.

Further, the execution of the applications 130 via the processing unit 135 may be facilitated by an operating system 150 of the host device 105. The operating system 150 is a system software program that manages the various hardware and software resources of the computing system 100. Specifically, the operating system 150 serves as an intermediary between the hardware resources of the computing system 100 and the applications 130 requesting execution. The operating system 150 may be any of a variety of types of operating systems such as Microsoft Windows, macOS, iOS, Android, UNIX, Linux, etc. that are suitable for the computing system 100.

Upon receiving input from a user, via an initial shell and the input devices 115, for running one of the applications 130 (e.g., the application 140A), the operating system 150 creates an execution ready process for that application. The executable ready process of the application 140A requests the operating system 150 for memory allocation to run the application. Upon receiving the memory allocation request, the operating system 150 allocates memory to the application 140A in the application's virtual address space.

The operating system 150 creates the execution ready process by copying the executable code of the application 140A from a non-volatile memory to a volatile memory of the computing system 100. For example, the executable code of the application 140A may be stored within the memory storage device 110. The executable code may be stored in the form of an executable image. In some embodiments, the operating system 150 may create the executable process by loading or copying the executable image of the executable code associated with the application 140A from the memory storage device 110 to the physical memory 145. Since the physical memory 145 is faster (e.g., has lower memory latency) than the memory storage device 110, the copying of the executable image from the memory storage device to the physical memory is desirable for a faster execution of the application 140A.

In some embodiments, if the memory storage device 110 is faster or as fast as the physical memory 145 or if the physical memory includes non-volatile memory, the operating system 150 may avoid the need for copying the executable code from the memory storage device to the physical memory. Instead, the operating system 150 may store the executable image of the executable code as a created ready-for-execution process within the memory storage device 110 itself or in a non-volatile memory of the physical memory 145, and facilitate execution from the memory storage device/physical memory. Thus, based upon the configuration of the physical memory 145 and the memory storage device 110, the operating system 150 may vary creation of the execution ready process for executing the application 140A.

Among other resources, the execution ready process may include a process-specific data, a call stack to keep track of active subroutines, a heap to hold intermediate data generated during execution, security attributes, processor states, and a region of virtual memory which holds at least some of the information (e.g., variables, data, etc.) of the executable process. While the execution ready process has been explained with respect to the application 140A, it is to be understood that the above execution ready process is applicable to the other applications (e.g., the applications 130) as well.

Further, each of the applications 130 is associated with an address space (e.g., virtual address space). For example, the application 140A may be associated with address space 155A, the application 140N may be associated with address space 155N, and so on. Each of the address spaces 155A-155N (collectively referred to herein as the address space 155) defines a range of discrete addresses that the operating system 150 makes available to the associated one of the applications 140A-140N for execution. The execution ready process of the applications 130 (e.g., the application 140A) requests the operating system 150 for memory allocation. "Memory allocation," as used herein, means associating one or more empty memory pages with virtual address(es). The allocated memory page(s) may be used to store data.

Upon receiving the memory allocation request, the operating system 150 allocates memory to the address space 155 (e.g., the address space 155A of the application 140A). A memory management subsystem 160 of the operating system 150 may facilitate memory allocation.

The address space 155 may be allocated memory from the physical memory 145 and/or from the memory storage device 110. Further, the address space 155 may be allocated either volatile memory, non-volatile memory, or a combination of volatile memory and non-volatile memory. Thus, in contrast to conventional memory allocation of address spaces in which only volatile memory is allocated, the present disclosure provides a heterogeneous address space in which multiple types of memories may be allocated to the address space 155 depending upon the memory that is most suitable for handling the data/code that is stored at the corresponding location of the address space.

The physical memory 145 of the host device 105 may include volatile and non-volatile categories of memory.

Each category (volatile, non-volatile) may include a variety of memory types. For example, the physical memory 145 may include memory registers, cache memory, Static Random Access Memory (SRAM), Dynamic Random Access Memory (DRAM), Magnetoresistive Random Access Memory (MRAM), Phase Control Memory (PCM), Resistive Random Access Memory (ReRAM), 3D XPoint memory, ferroelectric random-access memory (FeRAM), holographic memory devices, and other types of byte addressable memory. In some embodiments, the physical memory 145 may additionally or alternatively include a hybrid memory that includes a volatile memory portion and a non-volatile memory portion. Although not shown, in some embodiments, the physical memory 145 may also include a memory controller for managing memory access to the physical memory.

By configuring the physical memory 145 with both categories (volatile and non-volatile) of memory and a variety of different types of memories in each category, the present disclosure provides a mechanism for creating a heterogeneous address space (e.g., the address space 155). Each address location in the heterogeneous address space may be associated with a memory category and memory type in that memory category of the physical memory 145 that is optimized for the data/code that is stored at that address location. Each address location of the heterogeneous address space is called a "superset." In some embodiments, each superset may contain one or more memory pages of a particular memory type. In some embodiments, each superset may be sized to be smaller than the size of a memory page. Thus, the size of each superset may vary and be different from the size of the other supersets in the address space 155. Further, in some embodiments, each byte of one superset may be allocated from the same memory type, while in other embodiments, different bytes of one superset may be allocated from different types of memory. Further, as discussed below in greater detail, each superset may be allocated a different type of memory from the other supersets in the address space.

Referring still to FIG. 1, the memory storage device 110 includes a memory controller 165 and a memory array 170. The memory controller 165 is configured to communicate with the host device 105, and particularly, with the operating system 150 (e.g., via the memory management subsystem 160) to retrieve data from and store data into the memory array 170. The memory array 170 may include any of a variety of types of volatile memory devices and non-volatile memory devices that are capable of performing selectable memory location level programming and erasing without altering data stored at other selectable levels. For example, each bit in the memory array 170 may be independently alterable without altering data stored in other bits in the non-volatile memory. Thus, the memory array 170 may be configured to write a "0" or a "1" (or alter the storage state) of any single bit without changing any other accessible bit. The memory array 170 may be configured to be byte-wise alterable, word-wise alterable, and/or alterable in other granularities. In some embodiments, the memory array 170 may be any of a variety of persistent or non-persistent memory devices suitable for use in the computing system 100.

It is to be understood that only some components of the computing system 100 are shown and described in FIG. 1. However, the computing system 100 may include other components such as various batteries and power sources, networking interfaces, routers, switches, external memory systems, controllers, etc. Generally speaking, the computing system 100 may include any of a variety of hardware, software, and/or firmware components that are needed or considered desirable to have in performing the functions described herein.

Figure 2:
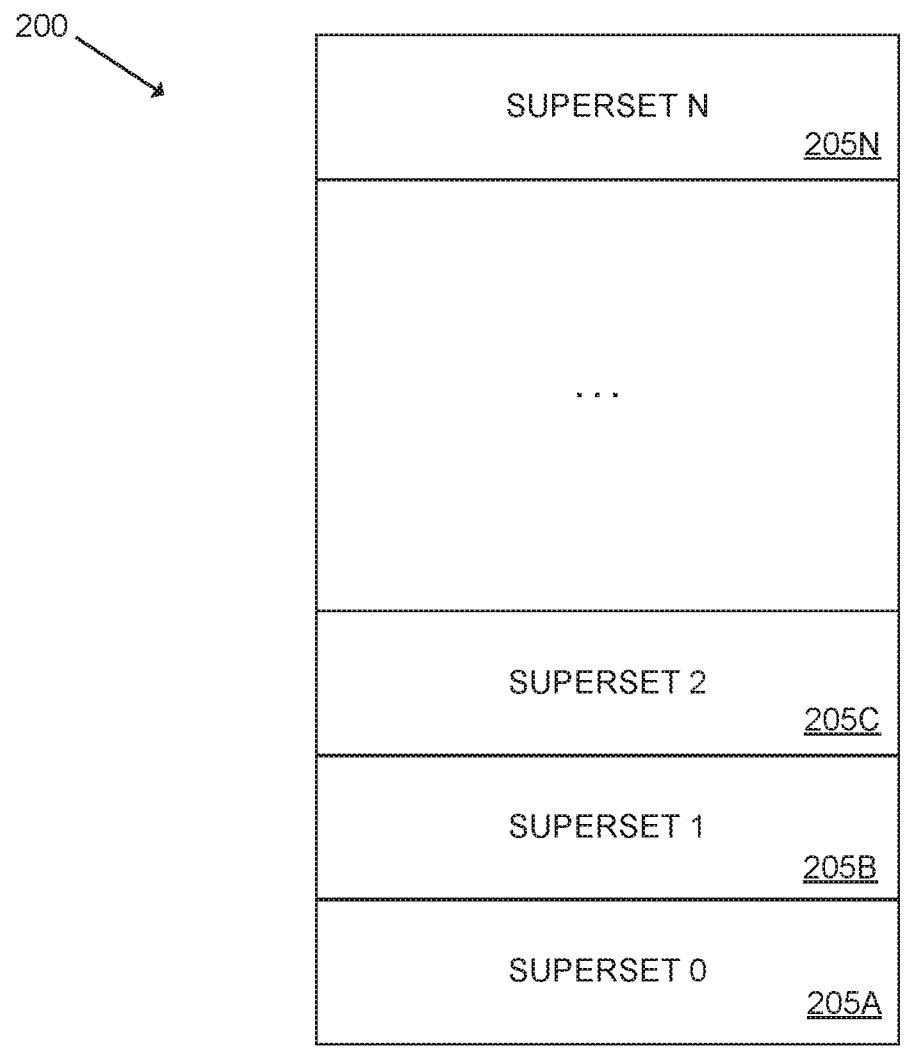
FIG. 2 is an example block diagram of a virtual address space of the computing system of FIG. 1, in accordance with some embodiments of the present disclosure.

Turning now to FIG. 2, an example virtual address space 200 is shown in accordance with some embodiments of the present disclosure. FIG. 2 is discussed in conjunction with FIG. 1. The virtual address space 200 is analogous to the address space 155. Thus, the virtual address space 200 may be considered the virtual address space of one of the applications 130 of FIG. 1. The virtual address space 200 includes a plurality of supersets 205A-205N. Although four supersets are shown in the virtual address space 200, the number of supersets in the virtual address space may vary to be fewer or greater than four. The number of the supersets 205A-205N in the virtual address space 200 may vary for each of the applications 130 and may depend upon the address range that is allocated to a particular one of those applications.

Each of the supersets 205A-205N may correspond to one or more memory pages of a conventional virtual address space. However, in contrast to a conventional virtual address space in which each address location of the virtual address space is allocated from a single category and type of memory and particularly a single type of volatile memory, the supersets 205A-205N of the virtual address space 200 are allocated memory from a volatile memory, a non-volatile memory, or a combination of volatile and non-volatile memories. Thus, each of the supersets 205A-205N of the virtual address space 200 may be allocated memory from any of the various memory categories and from any of the memory types in those categories of the physical memory 145 in FIG. 1. In some embodiments, one or more of the supersets 205A-205N may be allocated memory from the memory storage device 110.

The operating system 150 allocates memory to each of the supersets 205A-205N of the virtual address space 200 based on one or more superset features that the operating system determines from the application (e.g., one of the applications 130) requesting memory allocation. The operating system 150 may identify the one or more superset features in multiple ways. In some embodiments, the operating system 150 may associate one or more superset features with the application requesting memory allocation. For example, the operating system 150 may identify one or more superset features from the extended attributes of the executable code of the application requesting memory allocation. In some embodiments, the application requesting memory allocation may request memory allocation based on one or more superset features. Thus, the application may identify one or more superset features to the operating system 150 at the time of requesting memory allocation. In other embodiments, the operating system 150 may be familiar with the operation of the applications 130 and may identify the superset features based upon the operating system's understanding of the applications.

Thus, and as discussed in greater detail below, upon any of the applications 130 requesting memory allocation, the operating system 150 identifies one or more superset features, and allocates memory to each of the supersets 205A-205N of the virtual address space 200 based on the one or more superset features. Example superset features may include persistence type, data type, workload type, power consumption, latency, processing hardware, and locking primitive. Each of these superset features are explained in greater detail below. In other embodiments, the operating system 150 may be configured to allocate memory to the supersets 205A-205N based on additional or other superset features.

Referring now to FIG. 3, an example virtual address space 300 is shown in accordance with some embodiments of the present disclosure. FIG. 3 is discussed in conjunction with FIG. 1. The virtual address space 300, similar to the virtual address space 200, includes a plurality of supersets 305A-305N. Although at least four supersets 305A, 305B, 305C, and 305N are shown in the virtual address space 300, the number of the supersets may vary to be greater or fewer than four. The virtual address space 300 shows memory allocation of the supersets 305A-305N based on the superset feature persistence type. Persistence type means volatile memory or non-volatile memory. "Volatile memory" is any memory that requires power to maintain the information stored therein. "Non-volatile memory" is memory that is able to retain the information stored therein even after power is lost. In some embodiments, a "hybrid" memory that is a combination of volatile memory and non-volatile embodiments, may be used.

Thus, each of the supersets 305A-305N may be allocated memory from a volatile memory 310, from a non-volatile memory 315, or a hybrid memory 320. For example, as shown in FIG. 3, the superset 305A may be allocated memory from the volatile memory 310, the supersets 305B and 305N may be allocated memory from the non-volatile memory 315, and the superset 305C may be allocated memory from the hybrid memory 320. Thus, each of the supersets 305A-305N may be allocated memory from a different type of memory independent from the type of memory allocated to the other supersets.

In some embodiments, the volatile memory 310, the non-volatile memory 315, and the hybrid memory 320 may be part of the physical memory 145. In some embodiments, the volatile memory 310, the non-volatile memory 315, and the hybrid memory 320 may be part of the memory storage device 110. By virtue of allocating memory to each of the supersets 305A-305N from the volatile memory 310, the non-volatile memory 315, or the hybrid memory 320, the flexibility of the operating system 150 in managing the various operating system states, as well as facilitating execution of the applications 130 and managing user data of those applications is enhanced.

In some embodiments, the operating system 150 may allocate memory to the supersets 305A-305N based on the superset feature of data type. Data type means the various kinds of data that the computing system 100 is designed to handle. For example, in some embodiments, the various data types may include user data, metadata, and executable code. In other embodiments, the data type may include other or additional data types. "User data" is any data that is created or owned by a user. The user data may be of different types. For example, some user data (e.g., database user data) may be frequently updated, while other types of user data (e.g., video or image data) may be infrequently updated ("cold" data). Thus, in some embodiments, the user data may be categorized based upon the frequency of updates. Other categorizations of user data may be used in other embodiments. "Metadata" is any data that provides information about other data in the computing system 100. For example, metadata may provide information such as date of creation of data, author of the data, means of creating the data, data size, data location, source of the data, purpose of the data, etc. "Executable code" is any data that provides instructions to perform one or more operations for executing a software program.

The operating system 150 may determine the data type from the extended attributes of files in the file system (e.g., extended attributes of the applications 130). In other embodiments, the operating system 150 may be configured to determine the data type in other ways, as discussed above. Further, each data type (e.g., user data, metadata, executable code) may have certain characteristics known to the operating system 150 based on which the operating system may allocate memory to the supersets. For example, the operating system 150 may be aware that metadata is frequently updated data, while executable code is infrequently updated data. The operating system 150 may also be aware that the frequency of updating user data may be dependent upon the type of operation (e.g., read, write, update) that is to be performed on the user data. In some embodiments, the operating system 150 may be configured to learn about the updating frequency of user data from past operations performed on that user data and/or from the extended attributes of files in the file system. For example, the operating system 150 may determine from past operations, that a certain user data is frequently updated or a certain user data is only read and seldom updated.

What constitutes as "frequently" or "infrequently" updated data type may be programmed within the operating system 150. For example, in some embodiments, the operating system 150 may be configured to conclude that a data type (e.g., user data, metadata, executable code) is "frequently" updated if modifications are made to the data type greater than a predetermined number of times in any predetermined time period. In other embodiments, other criteria may be used to determine the frequency of updates. Based upon the characteristics of the data type, the operating system 150 may determine which category (e.g., volatile or non-volatile) of memory may be best suited for that data type.

Each type of volatile memory and non-volatile memory in the computing system 100 has certain memory characteristics. For example, in some embodiments, each memory in the physical memory 145 and the memory storage device 110 may be classified based upon memory latency, power consumption, and endurance. In other embodiments, the physical memory 145 and/or the memory storage device 110 may be classified based on other or additional memory characteristics. Upon determining the data type, the operating system 150 may be configured to determine which of the memory characteristics to prioritize over other memory characteristics.

For example, since metadata is frequently updated, if the operating system 150 determines that the data type is metadata, the operating system attempts to allocate a fast memory for storing metadata. In some embodiments, from the pool of available memory in the physical memory 145 and the memory storage device 110, the operating system 150 may identify the fastest volatile or non-volatile memory (e.g., the memory with the lowest memory latency) and allocate that memory to the superset(s) storing metadata. In other embodiments, the operating system 150 may determine that since metadata is frequently updated, a memory with good memory endurance is needed for metadata. Since frequent updates require a memory that does not fail or cause errors with frequent updates, the operating system 150 may prioritize endurance over memory latency and find a memory with good endurance. Since volatile memories have better endurance than non-volatile memories, the operating system 150 may allocate a volatile memory from the physical memory 145 or the memory storage device 110 that has the best endurance (or endurance that is relatively better than others).

In some embodiments, the operating system 150 may allocate a non-volatile memory to metadata even if a faster volatile memory or a volatile memory with better endurance is available. Since metadata needs to be stored longer term, it may be desirable to allocate a non-volatile memory to metadata. In such cases, the operating system 150 may identify a non-volatile memory from the physical memory 145 or the memory storage device 110 that is the fastest and has best endurance in the group. If the pool of available non-volatile memory is such that the operating system 150 can either find a fast memory or a memory with good endurance, the operating system may be configured to prioritize either memory latency or endurance. For example, in some embodiments, the operating system 150 may allocate MRAM to metadata. In other embodiments, the operating system 150 may allocate other types of non-volatile memories to metadata. In some embodiments, the operating system 150 may allocate a hybrid memory to metadata.

Similarly, if the operating system 150 determines that the requested page stores the data type of executable code, the operating system may determine that the executable code is not frequently updated, and therefore, does not need to be frequently saved. Thus, the operating system 150 may determine that endurance is not crucial for executable code. However, to facilitate a fast execution of the applications 130, the operating system 150 may determine that memory latency is important. Since volatile memories are faster than non-volatile memories, the operating system 150 may allocate a volatile memory to executable code. If the physical memory 145 includes multiple types of volatile memories, the operating system may compare the relative memory latencies of the various volatile memories and decide which one of the volatile memory is fastest. If the physical memory 145 only includes a single type of volatile memory, the operating system 150 may allocate that volatile memory to the executable code. In some embodiments, if the physical memory 145 also includes hybrid memory, the operating system may be configured to prioritize either volatile memory or hybrid memory for allocation.

Likewise, if the data type is user data, the operating system 150 may need to determine additional information about the user data to identify which type of memory to allocate. For example, in some embodiments, the operating system 150 may determine the type of operation being performed on the user data and allocate memory based on that operation, as discussed in FIG. 5 below. FIG. 4, thus, shows a virtual address space 400 in accordance with some embodiments of the present disclosure. Similar to the virtual address space 200, 300, the virtual address space 400 includes a plurality of supersets 405A-405N. Although four supersets are shown in the virtual address space 400, the virtual address space may include greater or fewer than four supersets. Each of the plurality of supersets 405A-405N may be assigned volatile memory, non-volatile memory, or hybrid memory based on the data type. For example, in some embodiments, the operating system 150 may allocate volatile memory, non-volatile memory, or hybrid memory in the supersets 405A, 405N for storing metadata, allocate volatile memory or hybrid memory in the superset 405B for storing executable code, and allocate either volatile, non-volatile, or hybrid memory for the superset 405C for storing user data based upon the type of operation (e.g., workload type) being performed on the user data.

Referring now to FIG. 5, an example virtual address space 500 is shown, in accordance with some embodiments of the present disclosure. Similar to the virtual address space 200, 300, 400, the virtual address space 500 includes a plurality of supersets 505A-505H. Although eight supersets (e.g., the plurality of supersets 505A-505H) are shown in FIG. 5, the number of supersets within the virtual address space 500 may vary to be greater than or fewer than eight. Each of the plurality of supersets 505A-505H may be allocated memory based upon the workload type. Workload type defines the type of operations that are to be performed on user data. For example, the workload type may include read, write, update, or various combinations (e.g., read and update; write and update; read and write; read, write, and update) thereof. "Reading" user data means accessing data previously stored within the physical memory 145 or the memory storage device 110. "Writing" user data means storing new data to the physical memory 145 or the memory storage device 110. "Updating" user data means changing or modifying previously stored data or writing new data and modifying the new data.

The operating system 150 may determine the workload type based on certain workload flags from the applications 130 requesting memory allocation. Based upon the workload type, the operating system 150 may decide which type of memory to allocate to the user data. For example, if the operating system 150 determines that workload type is a write only operation, in some embodiments, the operating system may allocate memory from the memory storage device 110 such that the user data is stored at its final location instead of first storing the user data in the physical memory 145 and then transferring the user data from the physical memory to the memory storage device. In other embodiments, the operating system 150 may store the data temporarily in the physical memory 145 (in either volatile, non-volatile, or hybrid memory) for faster storage and then transfer the user data to the memory storage device 110 at a later time.

If the operating system 150 determines that the workload type is a read only operation, the operating system 150 may determine the location (e.g., the physical memory 145 or the memory storage device 110) from which data is to be read. Based on the location of the data to be read, the operating system 150 may allocate memory either from the physical memory 145 or the memory storage device 110. For example, if the data is stored in the physical memory 145, instead of allocating empty memory pages, the operating system 150 may simply map the region of the physical memory where the data to be read is stored into the virtual address space 500 of the application (e.g., the applications 130). Likewise, if the data is stored within the memory storage device 110, the operating system 150 may map the region of the memory storage device where the data to be read is stored to the virtual address space 500 of the application (e.g., the applications 130). Further, in some embodiments, the operating system 150 may determine that the user data is a frequently read data (e.g., from past history of the user data). In such cases, the operating system 150 may copy the data to a faster memory and map that faster memory to the virtual address space 500.

If the operating system 150 determines that the workload type is an update operation (whether coupled with a write operation or a read operation), the operating system 150 may allocate a non-volatile memory from the physical memory 145, particularly a low memory latency and good endurance non-volatile memory, for faster updates.

Thus, based on the workload type, the operating system 150 may allocate memory to each of the supersets 505A-505H of the virtual address space 500. In some embodiments, the operating system 150 may consider the power requirements of the applications 130 requesting memory allocation in allocating memory for the various workload types. Power consumption (also referred to herein as "power requirement") is an important factor for modern computing systems, particularly for applications based on embedded solutions. At least some of the applications 130 may dictate special requirements for power consumption. In some embodiments, the computing system 100 may have various classifications of power consumption: low power, guaranteed power, guaranteed execution time, and maximum performance. In other embodiments, the computing system 100 may use other power consumption classifications. The applications 130 may specify the type of power consumption classification to be applied while executing operations associated with that application.

"Low power" power consumption classification means using minimum amount of power or using power below a certain threshold, which may be pre-programmed within the operating system 150. "Guaranteed power" power consumption classification means that the operating system 150 guarantees completion of an operation of the applications 130 requiring guaranteed power regardless of whether power to the computing system 100 is disrupted. "Guaranteed execution time" power consumption classification means that the operating system 150 guarantees completion of an operation of the applications 130 requiring guaranteed execution time regardless of the amount of power consumption. "Maximum performance" power consumption classification means that the operating system 150 guarantees completion of an operation of the applications 130 requiring maximum performance as fast as possible.

In some embodiments, the operating system 150 may be configured to determine the power consumption requirement of the applications 130 from a power consumption flag in those applications. In some embodiments, the computing system 100 may have a defined power consumption requirement that universally applies to all the applications 130 and supersedes the individual power consumption requirements of those applications. For example, and without intending to be limiting in any way, in some embodiments, the computing system 100 may define that the power consumption classification is guaranteed execution time. In such cases, the operating system 150 may be configured to ignore the individual power consumption requirements of the applications 130 and allocate memory to those applications based on the power consumption classification defined by the computing system 100.

Further, based on the power consumption requirement, the operating system 150 may allocate memory to the various workload types. For example, if the power consumption requirement is low power consumption, then the operating system 150 may be configured to allocate a non-volatile memory for each of read, write, and update operations since a non-volatile memory consumes less power than a volatile memory. If the power consumption requirement is guaranteed power, then the operating system 150 may be configured to allocate memory to read and write operations from a non-volatile memory. For update operations, the operating system 150 may allocate a volatile memory to perform the updates (since a volatile memory is faster than a non-volatile memory) and the result of the update may be stored within a non-volatile memory. Thus, for an update operation, the operating system 150 may allocate two pages: one from a volatile memory and one from a non-volatile memory. In some embodiments, if the computing system 100 has a hybrid memory, the operating system 150 may allocate the hybrid memory for update operations.

Similarly, for guaranteed execution time power consumption, the operating system 150 may be configured to allocate a non-volatile memory for read operations and use a combination of volatile and non-volatile memories for the write and update operations since a volatile memory is faster than a non-volatile memory. For maximum performance power consumption, the operating system 150 may additionally consider latency requirements in determining the memory allocation, as discussed below in FIG. 7.

Thus, based on the universal power consumption classifications defined by the computing system 100 that apply to all the applications 130 or in the absence of the universal power consumption classifications, the power consumption classifications defined by individual ones of the applications 130, the operating system 150 may determine a category (e.g., volatile, non-volatile, hybrid) memory to the various workload types. Further, when the selected category of memory includes multiple types of memory, the operating system 150 may determine the most suitable one of the memory type for allocation. Therefore, FIG. 6 shows a virtual address space 600 defining supersets based on power consumption, in accordance with some embodiments of the present disclosure. Similar to the virtual address space 200, 300, 400, and 500, the virtual address space 600 includes a plurality of supersets 605A-605G. Although seven supersets are shown in the virtual address space 600, the number of supersets may vary to be greater or fewer than seven in other embodiments. Each of the supersets 605A-605G may be allocated memory based on the power consumption classification and the workload type, as discussed above.

Turning to FIG. 7, a virtual address space 700 is shown, in accordance with some embodiments of the present disclosure. Similar to the virtual address spaces 200-600, the virtual address space 700 includes a plurality of supersets 705A-705F. Although six supersets are shown in the virtual address space 700, the number of supersets may vary to be greater or fewer than six in other embodiments. Each of the supersets 705A-705F may be allocated memory based upon a memory latency (also referred to herein as "latency") requirement of the applications 130 for completing operations associated with those respective applications. Memory latency is a critical factor that impacts performance of data processing. While each of the applications 130 may ideally desire a lowest memory latency possible (such that their operations are executed as fast as possible), practically speaking, not all types of operations necessarily benefit from a fastest execution. Thus, the operating system 150 may be configured to allocate memory based on memory latency, particularly when a maximum performance power consumption is desired.

In some embodiments, memory latency may be classified into multiple categories as follows: no latency, some latency, low latency, high latency, and huge latency. "No latency" means completing execution of an operation in the order of picoseconds-nanoseconds. "Some latency" means completing execution of an operation in the order of nanoseconds, while "low latency" means completing execution of an operation in the order of nanoseconds-microseconds. A "high latency" means completing execution of an operation in the order of microseconds-milliseconds, while a "huge latency" means completing execution of an operation in the order of seconds. It is to be understood that the time units that define each latency category above may vary in other embodiments.

The operating system 150 may determine the memory latency requirements of the applications 130 based upon latency flags set by those applications. Thus, if the applications 130 requesting memory allocation have a power consumption classification of maximum performance that is not superseded by a universal power consumption classification of the computing system 100, the operating system 150 may determine the memory latency requirements of those applications. For the applications 130 desiring no latency, the operating system may allocate memory from a volatile memory that is fastest in the group of available memory. For example, if the physical memory 145 has SRAM type of volatile memory, the operating system 150 may allocate SRAM for no latency operations regardless of the workload type since SRAM memories are faster than other types of volatile memories. Similarly, for the applications 130 desiring some latency, the operating system 150 may again allocate memory from a volatile memory, such as SRAM volatile memory, regardless of the workload type, assuming SRAM is a memory type that is available in the physical memory 145.

For low latency and high latency operations, the operating system 150 may use a combination of volatile and non-volatile memory depending upon the workload type. When volatile memory is allocated for low latency and high latency operations, a memory that is slower than SRAM (no latency, some latency) may be used. For example, in some embodiments, a DRAM memory may be used for the volatile memory allocation for low and high latency operations, assuming the physical memory 145 includes a DRAM memory. For huge latency operations, in some embodiments, the operating system 150 may allocate the memory storage device 110 for "cold" data, or in other words, data that is rarely used or accessed, and a combination of non-volatile memory and volatile memory for other workload types similar to the low latency and high latency operations.

Figure 8:
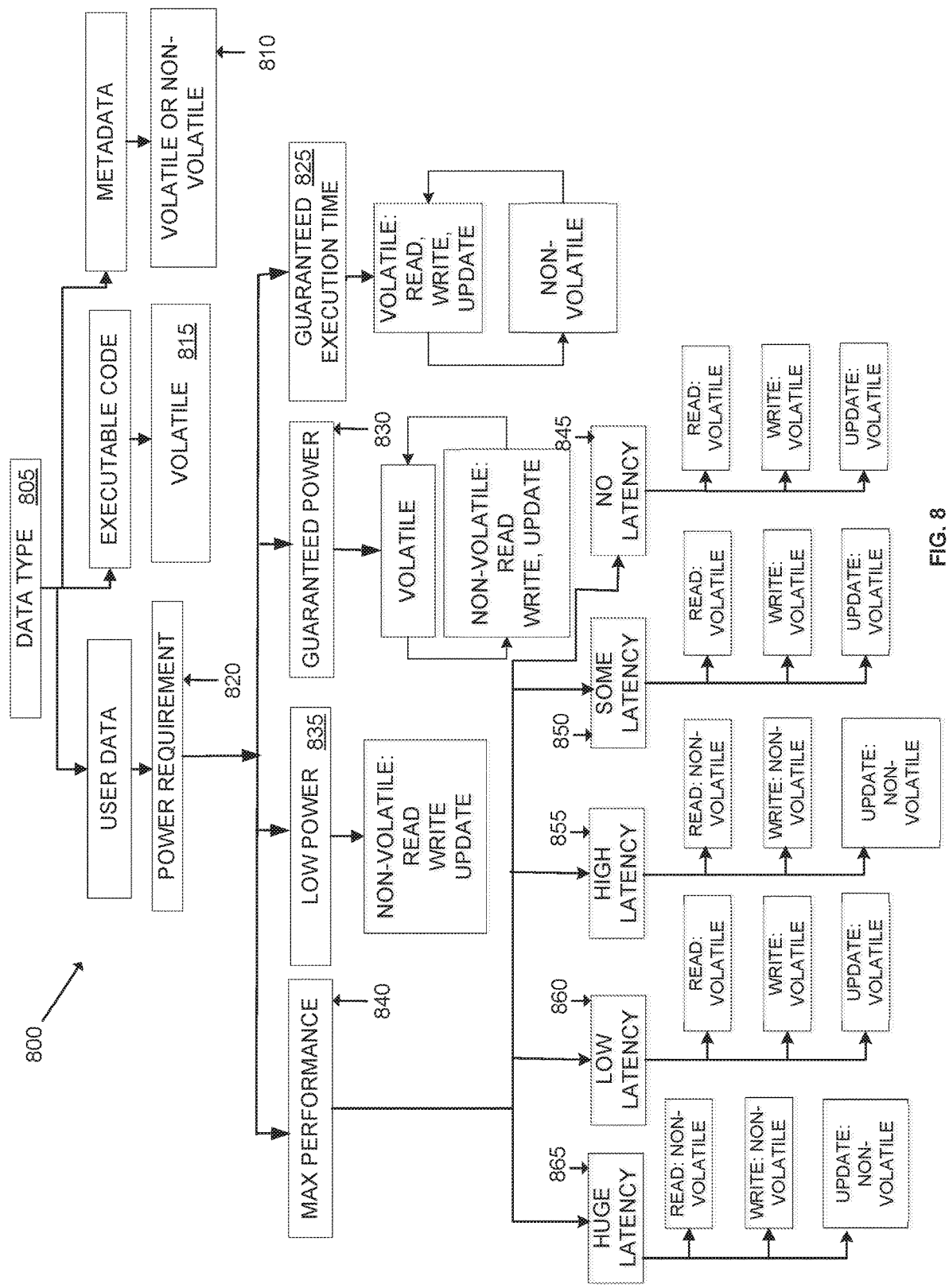
FIG. 8 is an example flow diagram outlining memory allocation in the virtual address space of FIG. 2 from physical memory based upon a combination of data type, workload type, power consumption, and latency, in accordance with some embodiments of the present disclosure.

Thus, in some embodiment, the operating system 150 may use a combination of data type, workload type, power consumption, and latency to determine memory allocation in the supersets of an address space. FIG. 8 shows an example flow diagram 800 outlining operations of how the operating system 150 may allocate memory for various data types, workload types, power consumption, and latency requirements. Upon receiving request for memory allocation from an application (e.g., the applications 130), at operation 805, the operating system 150 determines the data type (metadata, executable code, user data) of data that is to be stored in the allocated memory. As discussed above, the operating system 150 may identify the data type of the data that is to be stored in the allocated memory in a variety of ways. For example, the operating system 150 may determine the data type from the extended attributes of files in the file system, from past executions of the application requesting memory allocation, the application may identify the data type (e.g., via flags), or in other ways. Based upon the data type, the operating system 150 may determine which memory characteristics are likely to be important in allocating memory for that data type.

As discussed above, each category of memory (e.g., volatile, non-volatile) has certain properties or characteristics such as endurance, memory latency, and power consumption. The operating system 150 is aware of the relative memory characteristics of the various memories in the computing system 100. Further, some categories (e.g., volatile, non-volatile) of memory may have a single type of memory therein, while other categories of memory may have multiple types of memories therein. For example, in some embodiments, the volatile memory may only have a DRAM memory. In other embodiments, the volatile memory may have DRAM, SRAM, and other volatile memories. Similarly, in some embodiments, the non-volatile memory may only have MRAM. In other embodiments, the non-volatile memory may have MRAM, PCM, and other non-volatile memories. Further, since hybrid memories are combinations of volatile and non-volatile memory, any hybrid memory in the computing system 100 may be classified as either volatile memory or non-volatile memory. Thus, the category (e.g., volatile, non-volatile) of memory in the computing system 100 and the types of memory in each memory category may vary from one embodiment to another.

In some embodiments, between the physical memory 145 and the memory storage device 110, the computing system 100 may include a variety of volatile and non-volatile memories such as cache memory, SRAM, DRAM, MRAM, PCM, ReRAM, HDD, SDD, hybrid, etc. as discussed above. The operating system 150 may be aware of the relative differences in characteristics of these memories. For example, the operating system 150 may know that volatile memories are faster than non-volatile memories, that volatile memories consume more power than non-volatile memories, and that volatile memories have better endurance than non-volatile memories. In each category, the operating system 150 may further be configured to be aware of the relative differences in the memory properties of the various memory types of that particular memory type. For example, if the computing system 100 includes multiple types of volatile memories (e.g., SRAM, DRAM, etc.), the operating system 150 may be aware that the SRAM is the fastest followed by DRAM. Likewise, if the computing system 100 includes multiple types of non-volatile memories (e.g., MRAM, PCM, ReRAM, etc.) the operating system 150 may be aware that MRAM is faster than DRAM (even though DRAM is volatile and MRAM is non-volatile), and PCM and ReRAM are slower than DRAM and MRAM, and that HDD or SDD are slower than MRAM, DRAM, PCM, and ReRAM. Similarly, the operating system 150 may be aware of the relative power consumption requirements and the endurance levels of the various memory types.

It is to be understood that although the present disclosure has been explained with respect to certain types of volatile and non-volatile memories, in other embodiments, the number and types of memories in each memory category (volatile and non-volatile) may vary. Regardless of the number and types of memories in each memory category, the operating system 150 may be programmed to understand the relative differences between the various types of memories in each category and between different categories.

Thus, the operating system 150 may weigh the various memory characteristics to first determine the best memory category (volatile or non-volatile) to allocate. If the selected memory category has multiple memory types, the operating system may determine the most suitable memory type based upon other memory characteristics, other requirements (e.g., power consumption) of the computing system 100, requirements (e.g., memory latency) of the applications 130, and other factors programmed within the operating system.

Therefore, upon determining the data type at the operation 805, the operating system 150 determines which of the memory characteristics to prioritize over other memory properties for identifying the most suitable memory category for that data type. For example, if the operating system 150 determines the data type to be metadata, the operating system may conclude that metadata is frequently updated data, and therefore, a fast volatile memory and/or volatile memory having good memory endurance is more critical than a memory with low power consumption. In some embodiments, the operating system 150 may conclude that since metadata needs to be stored for longer periods of time, a non-volatile memory may be desirable, particularly if a non-volatile memory that is relatively faster and/or has good endurance is available. Thus, upon determining at the operation 805 that the memory pages being accessed store metadata, the operating system 150, at operation 810, allocates a volatile memory or a non-volatile memory from the physical memory 145 or the memory storage device 110 to the metadata.

Similarly, upon determining the data type to be executable code, the operating system 150 concludes that executable code is not frequently updated. Therefore, a memory with good endurance is not necessarily needed. To facilitate a faster execution of the executable code, the operating system 150 may prioritize memory latency over endurance and power consumption. Since volatile memories are faster (e.g., have lower latency) than non-volatile memories, the operating system allocates memory to the executable code from a volatile memory at operation 815.

If the operating system 150 determines, at the operation 805, that the data type is user data, the operating system may determine additional superset features that may apply to the user data. For example, at operation 820, the operating system 150 may determine the power requirement associated with the application (e.g., applications 130) being executed. In some embodiments, the power requirement may be the universal power requirement that applies to all of the applications 130 regardless of the individual power requirement of the various applications. In other embodiments, the power requirement may be the individual power requirement of the application (e.g., applications 130) being executed and which is not superseded by the universal power requirement. For example, the operating system 150 determines, at the operation 820, whether the power requirement is guaranteed execution time (operation 825), guaranteed power (operation 830), low power (operation 835), or maximum performance (operation 840).

For guaranteed execution time power requirement of the operation 825, the operating system 150 may determine that memory latency is more important than memory endurance or power consumption. Thus, since volatile memories are faster than non-volatile memories, the operating system 150 may initially allocate a volatile memory for read, write, and update operations. After a predetermined timeout period, if no additional update operations are received, the data from the volatile memory may be flushed out to a non-volatile memory. Any subsequent read, write, and update operations received after the flushing from the volatile to non-volatile memory may be serviced from the non-volatile memory. However, if the frequency of the read, write, and update operations increases (e.g., the number of read, write, update operations received in a predetermined period is greater than a predetermined number), the data may be fetched again to the volatile memory. Any further read, write, and update operations may then be serviced from the volatile memory. Thus, the operating system 150 may allocate both volatile and non-volatile memories for read, write, and update operations when the power requirement is guaranteed execution time. In some embodiments, the operating system 150 may allocate a hybrid memory to the read, write, and update operations to avoid the need to transfer data between the volatile memory and the non-volatile memory.

For a guaranteed power operation of the operation 830, since non-volatile memories retain data after power is lost, the operating system 150 may initially allocate a non-volatile memory for read, write, and update operations. However, similar to the guaranteed execution time power requirement, the operating system 150 may be configured to transfer data to a volatile memory based upon certain conditions being satisfied, and back again to the non-volatile memory based upon certain other conditions being satisfied. Thus, the operating system 150 may allocate both, a volatile memory and a non-volatile memory for guaranteed power operations. In some embodiments, instead of allocating a combination of volatile and non-volatile memories, the operating system 150 may allocate a hybrid memory for guaranteed power operations.

For a lower power operation of the operation 830, the operating system 150 may allocate a non-volatile memory for each of read, write, and update operations because a non-volatile memory consumes less power than a volatile memory. For maximum performance power requirement at the operation 840, the operating system 150 determines the latency requirements desired by the applications 130. For example, the operating system 150 determines whether the memory latency requirement is no latency (operation 845), some latency (operation 850), high latency (operation 855), low latency (operation 860), or huge latency (operation 865). For no latency operations of the operation 845 and some latency operations of the operation 850, the operating system 150 may assign a volatile memory for each of read, write, and update operation to facilitate faster completion of those operations. For high latency operations of the operation 855, the operating system 150 may assign a non-volatile memory for read, write, and update operations. For low latency operations of the operation 860, the operating system 150 may assign a volatile memory for read, write, and update operations. For huge latency operations of the operation 865, the operating system 150 may assign a non-volatile memory for each of read, write, and update operations.

Further, in each operation of the flow diagram 800, if multiple types of volatile and non-volatile memories exist within the computing system 100, the operating system 150 may elect the most suitable memory type in that volatile or non-volatile memory category for allocation. Thus, the operating system 150 may determine one or more superset features (e.g., data type, workload type, power performance, latency, etc.), identify the category (volatile, non-volatile) of memory that is most suitable based on those superset features, and allocate memory to the address space (e.g., the address space 155) by electing a memory from the category determined to be most suitable. Although memory allocation for the executable code (operation 815) and metadata (operation 810) have been discussed only with respect to the superset feature of data type, in some embodiments, the operating system 150 may consider one or more additional superset features, such as power requirement, latency, etc., for determining the proper type of memory to allocate to those data types. Similarly, although latency requirements have not been used in FIG. 8 for determining memory allocation for guaranteed execution time (operation 825), guaranteed power (operation 830), and low power (operation 830), in some embodiments, latency may also be used for determining memory allocation for those power requirements.

Turning now to FIG. 9, a virtual address space 900 is shown, in accordance with some embodiments of the present disclosure. The virtual address space 900, similar to the virtual address space 155, 200, 300, 400, 500, 600, and 700, includes a plurality of supersets 905A-905E. Although five supersets are shown in the virtual address space 900, in other embodiments, the number of supersets in the virtual address space may vary to be greater than or fewer than five. The virtual address space 900 shows memory allocation based on processing hardware. In some embodiments, in addition to or instead of the supersets features discussed above, the operating system 150 may decide memory allocation based on hardware acceleration engines that may be considered suitable for use by the applications 130.

Specifically, in some embodiments, the computing system 100 may include various hardware acceleration engines, such as a digital signal processing unit, a data processing unit ("DPU"), artificial intelligence, machine learning computing system, etc. Such hardware acceleration engines improve performance and/or quality of data processing and, thus, may be desired. Some computing systems may contain multiple types of hardware acceleration engines. Further, each hardware acceleration engine may be associated with a particular memory. In some embodiments, portions of the various memories (e.g., the physical memory 145, the memory storage device 110) may be dedicated to particular hardware acceleration engines.

The operating system 150 may determine if execution of a particular one of the applications 130 requires or may be improved by using certain hardware acceleration engines. In some embodiments, the applications 130 may include flags that may tell the operating system 150 that certain hardware acceleration engines are to be used. In other embodiments, the operating system 150 may determine based upon the type of operations the applications 130 are executing, from past executions of the applications, etc. which, if any, hardware acceleration engines are to be used. Upon determining that a particular one of the applications 130 is to use a certain hardware acceleration engine, the operating system 150 may allocate memory to at least some of the supersets 905A-905G based on the memory that is associated with that hardware acceleration engine. For example, the superset 905A may be allocated memory that is associated with artificial intelligence computing core, the superset 905B may be allocated memory that is associated with a central processing unit, the superset 905C may be allocated memory that is associated with a machine learning computing system core, and the supersets 905D and 905E may be allocated memories associated with a digital signal processing unit and data processing unit, respectively.

Referring now to FIG. 10, a virtual address space 1000 is shown, in accordance with some embodiments of the present disclosure. The virtual address space 1000, similar to the virtual address space 155, 200, 300, 400, 500, 600, 700, and 900 includes a plurality of supersets 1005A-1005G. Although seven supersets are shown in the virtual address space 1000, in other embodiments, the number of supersets in the virtual address space may vary to be greater than or fewer than seven. The virtual address space 1000 shows memory allocation based on locking primitives. In some embodiments, in addition to or instead of the supersets features and hardware acceleration engine discussed above, the operating system 150 may decide memory allocation based on locking primitives used by the applications 130.

Locking primitives are widely used for concurrent data processing. When memory is shared between multiple executable processes or multiple threads of the same executable process, specific locking primitives may be used to synchronize access to the shared memory from different threads. Example locking primitives may include critical section locking primitive, mutex locking primitive, read/write semaphore locking primitive, read-copy-update locking primitive, ready-modify-write locking primitive, compare-and-swap locking primitive, double compare-and-swap locking primitive, lease locking primitive, test-and-set locking primitive, and so on. Further, each locking primitive may define a special technique of accessing data stored in a particular memory page. Thus, the data access may be protected based upon the locking primitive that is applicable. Thus, when the operating system 150 determines that a certain locking primitive is to be used for certain data during memory allocation, the operating system may protect that data by applying the locking primitive to one or more of the supersets 1005A-1005G. The same locking primitive may be applied to a whole memory page or to a portion of a memory page.

In some embodiments, the operating system 150 may be programmed with the locking primitives that are to be used for each of the applications 130. In other embodiments, the operating system 150 may identify which, if any, locking primitive applies to a particular one of the applications 130 in other ways. Thus, as shown in FIG. 10, the operating system 150 may protect the data stored in the superset 1005A in accordance with the lease locking primitive, protect the data in the superset 1005B in accordance with the compare-and-swap locking primitive, and protect data stored in the supersets 1005C, 1005D, 1005E, 1005F, and 1005G in accordance with the read-copy-update, mutex, critical section, read/write semaphore, and ready-modify-write locking primitives, respectively.

Figure 11:
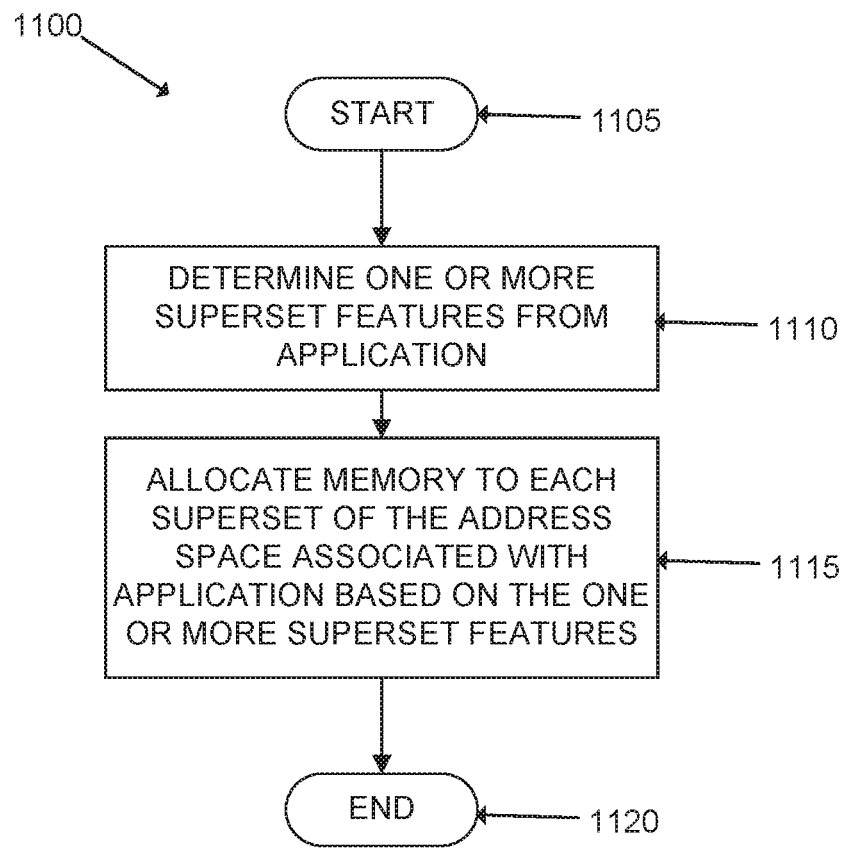
FIG. 11 is an example flowchart outlining operations of an operating system of the computing system of FIG. 1 for allocating memory to the virtual address space of FIG. 2, in accordance with some embodiments of the present disclosure.

Turning now to FIG. 11, an example flowchart outlining operations of a process 1100 are shown, in accordance with some embodiments of the present disclosure. The process 1100 may include other, additional, or different operations depending upon the embodiment. The process 1100 is discussed in conjunction with FIGS. 1-10. The process 1100 is implemented by the operating system 150. The process 1100 starts at operation 1105 when the operating system 150 receives a request for memory allocation from one of the applications 130. As discussed above, the operating system 150 creates a special or initial shell to receive user input. When a user desires to execute an application, the user sends an input to the operating system 150 via the initial shell. In response to the input, the operating system 150 creates an execution ready process for that application. The execution ready process requests memory allocation from the operating system 150. The process 1100 starts when the operating system 150 receives the memory allocation request from the execution ready process of the application.

Upon receiving the memory allocation request, the operating system 150 allocates memory to each superset of the address space of the application based upon one or more superset features. To allocate memory, the operating system 150 determines one or more superset features at operation 1110. As discussed above, the operating system 150 may identify the one or more superset features in multiple ways. For simplicity of explanation, locking primitives and hardware acceleration engines are also considered superset features herein. Thus, the operating system 150 may determine one or more of the data type, workload type, power requirement, latency, hardware acceleration engine, and locking primitive from one or more flags set by the application (e.g., the applications 130). In some embodiments, the operating system 150 may be programmed to use certain superset features with a particular one of the applications 130. In other embodiments, the operating system 150 may determine one or more superset features from past execution history of the application. Thus, the operating system 150 may identify one or more superset features of the application in multiple ways.

Further, in some embodiments, the operating system 150 may be configured to identify a single superset feature only of the applications 130 and allocate memory based on that superset feature. The superset feature to be identified for each of the applications 130 may be programmed within the operating system. The single superset feature being identified for each of the applications 130 may be same as or different from other applications on the computing system 100. In other embodiments, the operating system 150 may be configured to identify multiple superset features for each of the applications 130 using mechanisms discussed above. When identifying multiple superset features, in some embodiments, the operating system 150 may be configured to find a memory that satisfies all of the identified superset features. In other embodiments, the operating system 150 may be configured to prioritize the superset features such that certain superset features are given higher priority than others such that the memory allocation is based on the higher priority superset features. In some embodiments, the operating system 150 may be configured to identify a single superset feature in some of the applications 130 and multiple superset features in other ones of those applications.

Upon identifying one or more superset features, the operating system 150 allocates memory to each of the supersets at operation 1115 based on the superset features identified at the operation 1110. The superset feature(s) used for allocating memory, by the operating system 150, to one superset may vary from the superset feature(s) used for allocating memory to other supersets in the same address space. For example, in some embodiments, the operating system 150 may allocate memory to one superset in the address space based on data type only, to another superset based on locking primitive, yet another superset based on hardware acceleration engine, yet another superset based on workload type coupled with power requirement, and so on. Thus, the operating system 150 allocates memory to each of the supersets of the address space (e.g., the address space 155) based on the superset feature(s) that the operating system 150 considers most suitable for the information stored in that superset.

Specifically, based upon the identified one or more superset features and the various memory characteristics, the operating system 150 may first determine the appropriate category (volatile versus non-volatile) of memory. If the elected category of memory has multiple types of memories, then the operating system 150 may also determine the best suited memory type in that category. If a particular category only has a single type of memory, the operating system 150 may allocate that memory to the superset. In some embodiments, the computing system 100 may also include hybrid memory. The operating system 150 may be configured to select the memory storage device 110 and/or the hybrid memory (e.g., when a combination of volatile and non-volatile memory is desired) in certain situations.

In some embodiments, the memory allocated to each superset of the address space (e.g., the address space 155) during the execution of the application (e.g., the applications 130) may change during the same execution of the application. For example, in some embodiments, the operating system 150 may need to swap out data from the address space with other data (e.g., due to restricted amount of space in the address space). When swapping memory pages, the operating system 150 may repeat the operations 1110 and 1115 for the new data being swapped in to the address space. Thus, the type of memory allocated to a particular superset during a single execution of the application (e.g., the applications 130) may vary multiple times. Upon completion of execution of the application (e.g., the applications 130), the memory allocated in the virtual address space is freed and the process 1100 ends at operation 1120.

Figure 12:
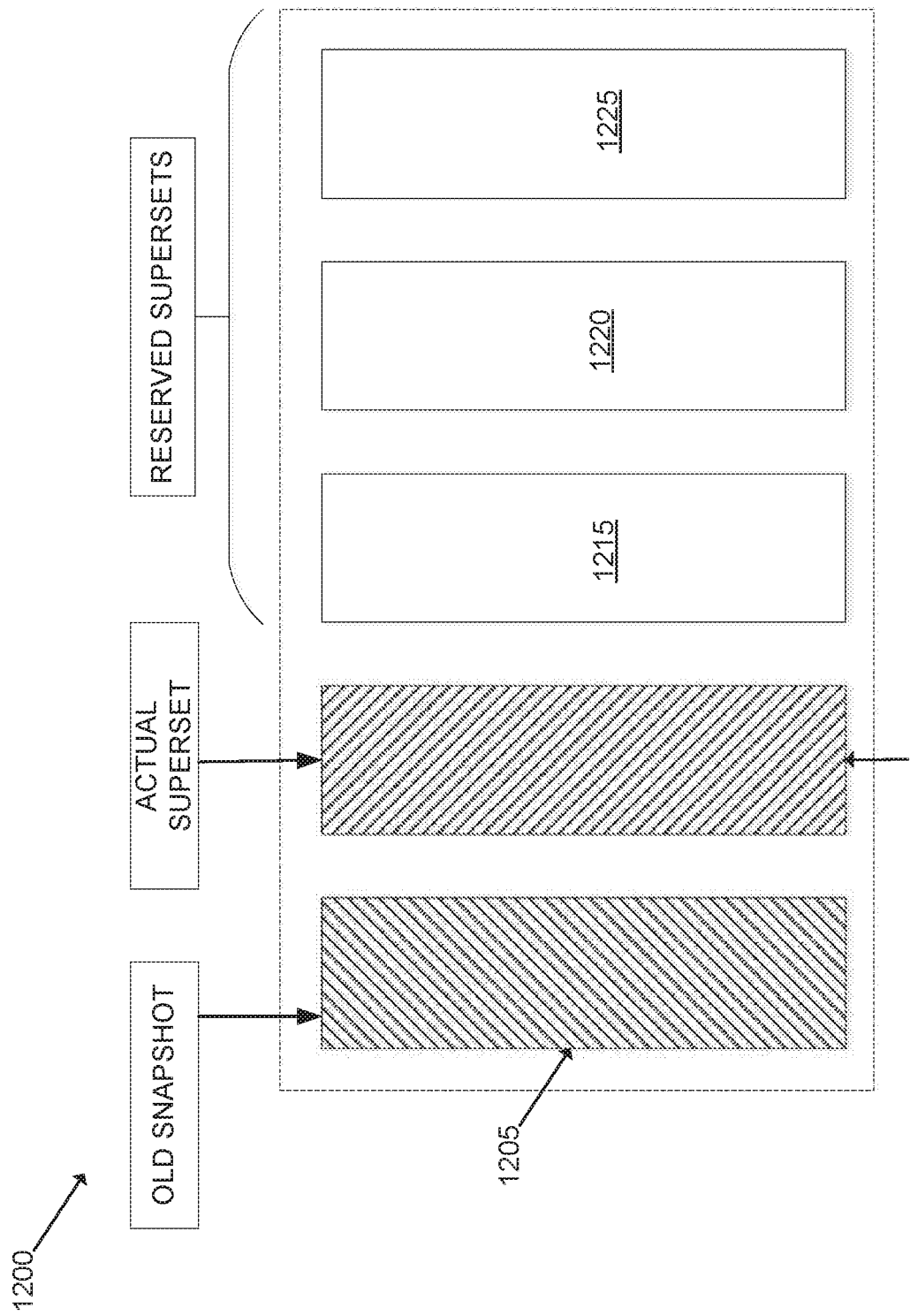
FIG. 12 is an example block diagram showing storage of the address space of FIG. 2, in accordance with some embodiments of the present disclosure.

Turning now to FIG. 12, an example address space 1200 is shown, in accordance with some embodiments of the present disclosure. Conventional address spaces are homogenous address spaces in which operating systems allocate memory from volatile memory only. As a result, any data that is stored in a volatile address space is lost after power-off. However, using a heterogeneous address space capable of non-volatile memory allocation provides an opportunity to keep one or more supersets persistently (e.g., keep data in the address space after power off). While in certain embodiments, it may be desired to allocate memory to a superset from volatile memory (e.g., due to security reasons, temporary data processing, etc.), in other embodiments, the superset may be allocated memory from a non-volatile memory that may be stored persistently for a longer period of time. However, the persistent nature of the supersets may be disrupted (e.g., deleted) due to a malfunction in the operating system 150, a virus impacting the computing system 100, or for any other reason. Thus, in some embodiments, a snapshot of a superset may be captured and stored. Snapshots may be captured of supersets allocated volatile memory or non-volatile memory. In general, the operating system 150 may be configured to snapshot any superset that is desired to be snapshotted.

For example, as shown in FIG. 12, a snapshot 1205 of a superset 1210 may be stored. The snapshot 1205 may be used if the actual superset 1210 (e.g., the data of the actual superset) is lost. In some embodiments, non-volatile memory pages 1215, 1220, 1225 may be reserved for storing additional snapshots of the superset 1210. In some embodiments, the operating system 150 may be configured to capture one snapshot every predetermined period of time. In other embodiments, the operating system 150 may be configured to capture a snapshot when the operating system determines that the information stored within that superset has changed. In yet other embodiments, the operating system 150 may be configured with other triggers for capturing snapshots and protecting the internal state of the operating system's objects. Further, in some embodiments, the entire address space may be snapshotted. In other embodiments, only certain supersets of an address space may be snapshotted.

Additionally, in some embodiments, the operating system 150 may create a snapshot in multiple ways. In some embodiments, the operating system 150 may create a copy of the superset (e.g., a copy of the state of the superset) and store the copy as a snapshot. In other embodiments, the operating system 150 may use other mechanisms to create the snapshot. Thus, by virtue of creating snapshots of one or more supersets, the operating system 150 and the address space of the present disclosure provides the capability of storing supersets persistently and improving data processing performance.

Thus, the present disclosure provides a heterogeneous address space in which memory may be allocated from volatile memory or non-volatile memory based upon the memory category that is considered most suitable for the information being stored in the address space.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   identifying, by an operating system of a host device, a plurality of superset features corresponding to a plurality of supersets of an application configured to be executed on the host device, each superset forming a portion of a virtual address space associated with the application, the plurality of superset features indicated by the application in a request for memory allocation, the plurality of superset features comprising two or more of data type, workload type, power requirement, and latency; and
   allocating, by the operating system of the host device, heterogeneous memory to the virtual address space associated with the application, wherein the operating system allocates the heterogeneous memory to each of the plurality of supersets from a non-volatile memory or a volatile memory based upon the corresponding superset features, including allocating at least a first superset of the application to non-volatile memory based on the first superset having a user application data type and allocating at least a second superset of the application to volatile memory based on the second superset having an executable code data type.

2. The method of claim 1, further comprising determining, by the operating system, the plurality of superset features from a plurality of flags of the application.

3. The method of claim 1, wherein:
   the volatile memory comprises a plurality of volatile memory types; and
   the operating system is configured to select one of the plurality of volatile memory types for allocating the heterogeneous memory to the second superset.

4. The method of claim 1, wherein:
   the non-volatile memory comprises a plurality of non-volatile memory types; and the operating system is configured to select one of the plurality of non-volatile memory types for allocating the heterogeneous memory to the first superset.

5. The method of claim 1, further comprising:
determining, by the operating system, an individual superset feature of the plurality of superset features to be a low power requirement; and
allocating, by the operating system, the heterogeneous memory to an individual superset associated with the individual superset feature from the non-volatile memory for each of read, write, and update operations.

6. The method of claim 1, further comprising:
determining, by the operating system, an individual superset feature of the plurality of superset features to be a guaranteed power requirement; and
allocating, by the operating system, the heterogeneous memory to an individual superset associated with the individual superset feature from a combination of the volatile memory and the non-volatile memory for read, write, and update operations.

7. The method of claim 6, further comprising:
initially performing, by the operating system, the read, write, and update operations for the guaranteed power requirement from the non-volatile memory;
transferring, by the operating system, data from the non-volatile memory to the volatile memory upon a first condition being satisfied, including performing the read, write, and update operations from the volatile memory after the transfer; and
re-transferring, by the operating system, the data from the volatile memory back to the non-volatile memory upon a second condition being satisfied, including performing the read, write, and update operations from the non-volatile memory after the re-transfer.

8. The method of claim 1, further comprising:
identifying, by the operating system, a latency requirement from the application; and
allocating, by the operating system, the heterogeneous memory to an individual superset associated with the individual superset feature based on the latency requirement.

9. The method of claim 8, further comprising:
allocating, by the operating system, the heterogeneous memory from the volatile memory for read, write, and update operations based upon the latency requirement being no latency, or low latency; and
allocating, by the operating system, the heterogeneous memory from the non-volatile memory for read, write, and update operations based upon the latency requirement being high latency or huge latency.

10. A system comprising:
a host device comprising:
a processing unit configured to execute an application; and
an operating system configured to allocate heterogeneous memory to an address space associated with the application, the address space comprises a plurality of supersets including at least a first superset and a second superset, and wherein the operating system is configured to:
identify at least a first data type corresponding to the first superset and a second data type corresponding to the second superset from an indication by the application in a request for memory allocation, the first data type is executable code of the application and the second data type is user data of the application; and allocate the heterogeneous memory to the address space from a non-volatile memory and volatile memory based upon the first and second data types in combination with at least one of workload type, power requirement, and latency, including:
allocate volatile memory to the first superset based upon the first data type being executable code; and
allocate non-volatile memory to the second superset based upon the second data type being user data and further based on a workload type associated with the user data.

11. The system of claim 10, wherein:
the volatile memory comprises a plurality of volatile memory types; and
the operating system is further configured to allocate one of the plurality of volatile memory types to the first superset based on the first data type being executable code.

12. The system of claim 10, wherein:
the non-volatile memory comprises a plurality of non-volatile memory types; and
the operating system is further configured to allocate one of the plurality of non-volatile memory types to the second superset based on the second data type being user data and further based on the workload type being a write only operation.

13. The system of claim 10, wherein the operating system is further configured to:
identify a locking primitive corresponding to a third superset from the application; and
protect data stored in the third superset based on the locking primitive.

14. The system of claim 10, wherein the operating system is further configured to:
identify a hardware acceleration engine corresponding to a third superset from the application; and
allocate the volatile memory or the non-volatile memory to the address space that is associated with the hardware acceleration engine.

15. The system of claim 10, wherein the operating system is further configured to:
vary the size of the first superset according to updating of data of the first superset; and
vary the size of the second superset according to updating of data of the second superset.

16. A computing system comprising:
means for storing computer-executable instructions; and
means for processing the computer-executable instructions to cause an operating system of the computing system to perform a process comprising:
receiving a request for memory allocation from an application of the computing system, the request indicating a plurality of features associated with a plurality of locations of a virtual address space associated with the application;
identifying a corresponding plurality of features for each location of the plurality of locations of the virtual address space associated with the application, the plurality of features including two or more of data type, workload type, power requirement, latency;
selecting between volatile memory and non-volatile memory of a heterogeneous memory for each location of the plurality of locations of the virtual address space based upon the corresponding plurality of features, including selecting non-volatile memory for a first location of the virtual address space based on a corresponding first data type being user data and selecting volatile memory for a second location of the virtual address space based on a corresponding second data type being executable code;

determining that a selected one of the volatile memory or the non-volatile memory comprises a plurality of memory types; and selecting one of the plurality of memory types from the selected one of the volatile memory or the non-volatile memory for allocating memory to each location of the virtual address space associated with the selected one of the volatile memory or the non-volatile memory.

\* \* \* \* \*